(12) United States Patent
Taniguchi et al.

(10) Patent No.: US 10,882,073 B2
(45) Date of Patent: Jan. 5, 2021

(54) METHOD FOR MANUFACTURING DECORATED ARTICLE BY DECORATING UNEVEN SURFACE, DECORATED ARTICLE BY DECORATING UNEVEN SURFACE, AND METHOD FOR MANUFACTURING DRAWN ARTICLE

(71) Applicant: NISSHA PRINTING CO., LTD., Kyoto (JP)

(72) Inventors: Chuzo Taniguchi, Kyoto (JP); Tetsu Nishikawa, Kyoto (JP); Ryosuke Mori, Kyoto (JP)

(73) Assignee: NISSHA PRINTING CO., LTD., Kyoto (JP)

( * ) Notice: Subject to any disclaimer, the term of this patent is extended or adjusted under 35 U.S.C. 154(b) by 455 days.

(21) Appl. No.: 15/515,204

(22) PCT Filed: May 28, 2015

(86) PCT No.: PCT/JP2015/065470
§ 371 (c)(1),
(2) Date: Mar. 29, 2017

(87) PCT Pub. No.: WO2016/051860
PCT Pub. Date: Apr. 7, 2016

(65) Prior Publication Data
US 2017/0216876 A1    Aug. 3, 2017

(30) Foreign Application Priority Data
Sep. 30, 2014    (JP) ................. 2014-200007

(51) Int. Cl.
*B05D 5/04*    (2006.01)
*B05D 3/06*    (2006.01)
(Continued)

(52) U.S. Cl.
CPC ............ *B05D 5/04* (2013.01); *B05D 1/26* (2013.01); *B05D 3/06* (2013.01); *B05D 3/12* (2013.01);
(Continued)

(58) Field of Classification Search
CPC ... B05D 5/04; B05D 3/06; B05D 7/24; B05D 3/12; B05D 1/26; B27M 3/00; B41J 2/01;
(Continued)

(56) References Cited

U.S. PATENT DOCUMENTS

2010/0141720 A1    6/2010    Ready et al.
2012/0231233 A1*   9/2012    Kanao ............... B28B 1/50
                                               428/195.1

FOREIGN PATENT DOCUMENTS

EP    2179856 A1    4/2010
JP    H05-337438 A  12/1993
JP    2009-012430 A  1/2009

OTHER PUBLICATIONS

Office Action in the corresponding European Patent Application No. 15846366.1 dated Oct. 10, 2018.
(Continued)

*Primary Examiner* — Robert S Walters, Jr.
(74) *Attorney, Agent, or Firm* — Global IP Counselors, LLP

(57) ABSTRACT

A method for manufacturing a decorated article having a smooth printing surface by performing an inkjet printing to an uneven surface of a carbon fiber reinforced plastic molding. An uncured rough-surface ink layer is formed on an undecorated uneven surface by performing an inkjet printing and using an active energy ray curable ink, and a temporary cover film is disposed to cover an upper surface of the uncured rough-surface ink layer. The surface of the uncured rough-surface ink layer is smoothed by applying a
(Continued)

pressing force to the uncured rough-surface ink layer from the upper surface of the temporary cover film. An active energy ray is applied, so that a cured smooth ink layer is formed, and the temporary cover film is peeled.

4 Claims, 4 Drawing Sheets

(51) Int. Cl.
    *B05D 7/24*     (2006.01)
    *B05D 3/12*     (2006.01)
    *B05D 1/26*     (2006.01)
    *B32B 27/00*     (2006.01)
    *B41M 5/00*     (2006.01)
    *B41M 7/00*     (2006.01)
    *B27M 3/00*     (2006.01)
    *B41J 2/01*     (2006.01)
    *C09D 11/00*     (2014.01)

(52) U.S. Cl.
    CPC ............... *B05D 7/24* (2013.01); *B27M 3/00* (2013.01); *B32B 27/00* (2013.01); *B41M 5/0047* (2013.01); *B41M 7/00* (2013.01); *B41M 7/0081* (2013.01); *B41J 2/01* (2013.01); *B41M 5/0064* (2013.01); *C09D 11/00* (2013.01)

(58) Field of Classification Search
    CPC ...... C09D 11/00; B32B 27/00; B41M 5/0047; B41M 7/0081; B41M 7/00; B41M 5/0064
    See application file for complete search history.

(56) References Cited

OTHER PUBLICATIONS

Alam et al.: "Online surface roughness characterization of paper and paperboard using a line of light triangulation technique", Nordic Pulp and Paper Research Journal, vol. 27, No. 03, Sep. 1, 2012, pp. 662-670.
Partial Supplementary Search Report in the corresponding European Patent Application No. 15846366.1 dated Nov. 3, 2017.
International Search Report in PCT/JP2015/065470 dated Aug. 25, 2015.

* cited by examiner

METHOD FOR MANUFACTURING DECORATED ARTICLE BY DECORATING UNEVEN SURFACE, DECORATED ARTICLE BY DECORATING UNEVEN SURFACE, AND METHOD FOR MANUFACTURING DRAWN ARTICLE

CROSS-REFERENCE TO RELATED APPLICATION

This U.S. National stage application claims priority under 35 U.S.C. § 119(a) to Japanese Patent Application No. 2014-200007, filed in Japan on Sep. 30, 2014, the entire contents of Japanese Patent Application No. 2014-200007 are hereby incorporated herein by reference.

BACKGROUND

Field of the Invention

The present invention relates to a method for manufacturing a decorated article which is manufactured by decorating an undecorated molded article having an uneven surface such as a molded article of a carbon fiber reinforced plastic (CFRP), a molded article of a fiber reinforced plastic (FRP), etc.

BACKGROUND ART

As a method for decorating an undecorated molded article having an uneven surface such as a molded article of the carbon fiber reinforced plastic (CFRP), an inkjet printing is performed (e.g. see Japanese Patent Application Publication No. 2009-12430).

However, when the inkjet printing is performed to the undecorated molded article having the uneven surface, the unevenness of a base remains on a printing surface, so that there was a defect that a smooth printing surface is not produced.

Further, in the inkjet printing, although the surface is a smooth surface, the unevenness occurs on the printing surface due to the ink droplet, so that there was a defect that the printing surface does not become a smooth surface.

SUMMARY

The problem to be solved is the point in which when the inkjet printing is performed to the undecorated molded article having the uneven surface, the smooth printing surface is not obtained.

Another problem to be solved is the point in which when the inkjet printing is performed, the smooth printing surface is not obtained.

Other objects to be solved by the present invention is described in the detailed description of the present invention.

The means for solving the problems will be described below. To facilitate understanding, the reference numerals are used to describe the embodiments of the present invention, but the present invention is not limited to these embodiments.

According to one aspect of the present invention of a method for manufacturing a decorated article by decorating an undecorated uneven surface of an undecorated base material. The method includes the following steps.

(I) In a printing process, an uncured rough-surface ink layer (31) is formed on an undecorated uneven surface (17) of an undecorated base material (16) by performing an inkjet printing using an active energy ray curable ink.

(II) In a coating process, a temporary cover film (41) is disposed to cover an upper surface of the uncured rough-surface ink layer.

(III) In a pressing process, an uncured smooth ink layer (51) is formed by applying a pressing force to the uncured rough-surface ink layer through the temporary cover film from the upper surface of the temporary cover film, and smoothing a surface of the uncured rough-surface ink layer contacting with the temporary cover film.

(IV) In a curing process, a cured smooth ink layer (61) is formed by applying an active energy ray through the temporary cover film from the upper surface of the temporary cover film, and curing the uncured smooth ink layer.

(V) In a peeling process, the decorated article (11) in which a cured smooth ink layer (61) is mounted on the undecorated uneven surface (17) of the undecorated base material (16) is obtained by peeling the temporary cover film.

In the preferred embodiment of the method for manufacturing the decorated article according to the present invention, an arithmetic average roughness (Ra) of the undecorated uneven surface of the undecorated base material may exceed 0.5 μm and is equal to or less than 5.0 μm, and the arithmetic average roughness (Ra) of a surface of the cured smooth ink layer is equal to or less than 0.5 μm.

Also, the undecorated base material may be a molded body of a carbon fiber reinforced plastic (CFRP) or a molded body of a glass fiber reinforced plastic (FRP).

Further, the active energy ray curable ink may be an ultraviolet ray curable ink, and the active energy ray is an ultraviolet ray.

In the preferred embodiment of the method for manufacturing the decorated article according to the present invention, the printing process includes (I-1) printing in a plurality of colors and forming an uncured rough-surface ink layer in which the undecorated uneven surface of the undecorated base material is drawn in different colors by performing an inkjet printing and using a plurality of colors of inks that are different from each other and are active energy ray curable.

According to another aspect of the present invention of the decorated article, in the decorated article, an undecorated base material is decorated. This is the decorated article (11) in which a cured smooth ink layer (61) is mounted on an undecorated uneven surface (17) of the undecorated base material (16) and is formed in contact with the undecorated uneven surface.

The arithmetic average roughness (Ra) of the undecorated uneven surface exceeds 0.5 μm and is equal to or less than 5.0 μm.

The cured smooth ink layer is drawn in a plurality of colors different from each other, and the cured smooth ink layer is cured by applying an active energy ray to an active energy ray curable ink.

The arithmetic average roughness (Ra) of a free surface (62) of the cured smooth ink layer is equal to or less than 0.5 μm.

Further, in the preferred embodiment of the decorated article according to the present invention, the cured smooth ink layer may be cured by applying an ultraviolet ray to an ultraviolet ray curable ink.

According to another aspect of the present invention of a method for manufacturing a drawn article having a smooth printed surface by performing an inkjet printing to make a drawing on a blank surface of a blank base material. The method includes the following steps.

(I) In a printing process, an uncured rough-surface ink layer (131) is formed on the blank surface (27) of the blank base material (26) by performing an inkjet printing using an active energy ray curable ink.

(II) In a coating process, a temporary cover film (41) is disposed to cover an upper surface of the uncured rough-surface ink layer.

(III) In a pressing process, an uncured smooth ink layer (151) is formed by applying a pressing force to the uncured rough-surface ink layer through the temporary cover film from the upper surface of the temporary cover film, and smoothing a surface of the uncured rough-surface ink layer contacting with the temporary cover film.

(IV) In a curing process, a cured smooth ink layer (161) is cured by applying an active energy ray through the temporary cover film from the upper surface of the temporary cover film, and curing the uncured smooth ink layer.

(V) In a peeling process, a drawn article in which a cured smooth ink layer (161) is mounted on the blank surface (27) of the blank base material (26) is obtained by peeling the temporary cover film.

In the preferred embodiment of the method for manufacturing the drawn article according to the present invention, the arithmetic average roughness (Ra) of the surface of the cured smooth ink layer may be equal to or less than 0.5 μm.

Also, the active energy ray curable ink may be an ultraviolet ray curable ink, and the active energy ray may be an ultraviolet ray. Further, the printing process may include (I-1) printing in a plurality of colors and forming an uncured rough-surface ink layer in which the blank surface of the blank base material is drawn in different colors by performing an inkjet printing and using a plurality of colors of inks different from each other and are active energy ray curable.

In the aforementioned description of the present invention, the elements included in the preferred embodiments of the present invention can be implemented in combinations as much as possible.

In the method for manufacturing the decorated article according to the present invention, with other specific matters of the invention, an inkjet printing process by using the active energy ray curable ink is employed, and a pressing process which applies the pressing force from the upper side of the temporary cover film, and a curing process, etc. are performed, so that the decorated article having a smooth printing surface which is not affected by the unevenness of the base can be manufactured. Further, in the method for manufacturing the decorated article according to the present invention, it is possible to perform a decoration in a highly precise design pattern.

The decorated article according to the present invention is provided with excellent surface smoothness, and further, the decorated article has rich design characteristics.

In the method for manufacturing the drawn article according to the present invention, with other specific matters of the invention, a printing process by using the active energy ray curable ink, a pressing process which applies the pressing force from the upper side of the temporary cover film, and a curing process, etc. are performed, so that although the inkjet printing is performed, the drawn article having a smooth printing surface can be manufactured.

DESCRIPTION OF EMBODIMENTS

Hereinafter, a method for manufacturing a decorated article, the decorated article, a method for manufacturing a drawn article, and the drawn article according to the embodiments of the present invention will be described in reference to the drawings. To facilitate understanding the present invention, in each drawing to be referred in the present specification, a part of the elements is exaggeratedly and schematically shown. Therefore, there is a case in which a dimension, a ratio, etc. between the elements are different from the actual dimension, ratio, etc. between the elements. Further, the dimensions, materials, shapes, relative arrangements and so on of the elements described in the embodiments of the present invention are not limited to the scope of the present invention disclosure to these alone in particular unless specifically described.

<Method for Manufacturing Decorated Article and the Decorated Article>

FIGS. 1A through 1F are explanatory diagrams showing a method for manufacturing a decorated article 11. FIGS. 1A through 1F show cross-sectional views of an undecorated base material 16 and other members.

Figure 1A:
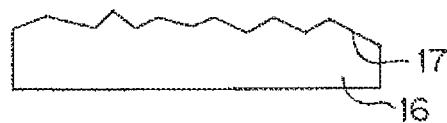
FIG. 1A is an explanatory diagram showing a method for manufacturing a decorated article.

The undecorated base material 16 shown in FIG. 1A has an undecorated uneven surface 17. The arithmetic average roughness (Ra) of the unevenness of the undecorated uneven surface 17 preferably exceeds 0.5 μm and is equal to or less than 5.0 μm, and more preferably, it exceeds 0.5 μm and is equal to or less than 1.0 μm. The range of the average roughness is preferable because conventionally, the numbers of processes were required for the decoration, and further, because it is possible to fill the unevenness by an ink layer formed by the inkjet printing.

The thickness of the undecorated base material 16 is not limited, so that the decoration method can be performed in any thickness. The moldings of the CFRP and the FRP in the thickness between 0.5 mm to 10.0 mm are generally used. For example, the decoration method can be preferably applied to these moldings.

Further, the plane size of the undecorated base material 16 is not particularly limited. The plane size which can be decorated in a single cycle is determined depending on the surface size which can be printed by the inkjet printer, the area where the active energy ray can be applied in a curing process, etc.

A primer may be applied on the undecorated uneven surface 17 in order to enhance the adhesiveness between the active energy ray curable ink and the undecorated uneven surface 17.

Figure 1B:
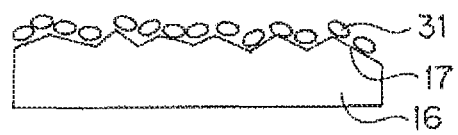
FIG. 1B is an explanatory diagram showing a method for manufacturing a decorated article.

First, a printing process is performed. The printing process is the process in which an uncured rough-surface ink layer 31 is formed on the undecorated uneven surface 17 of the undecorated base material 16 by jetting ink fine droplets by the inkjet printing. FIG. 1B shows the undecorated base material 16 after the printing process.

The uncured rough-surface ink layer 31 is the aggregate of the ink fine droplets. The ink amount of the uncured rough-surface ink layer 31 is the ink amount, which fills the unevenness of the undecorated uneven surface 17, and the ink amount a (surplus amount for a safety to obtain a smooth surface in all products). The ink amount is the amount which is determined by the following method.

Ra of the undecorated uneven surface 17 is defined as A. Normally, it is preferable to be equal to or more than 1.1 A and equal to or less than 2.0 A. It is more preferable to be equal to or more than 1.1 A and equal to or less than 1.5 A, and furthermore preferable to be equal to or more than 1.1 A and equal to or less than 1.4 A. The values in this range are defined as B. The ink amount is calculated in a way in which the ink is jetted to the printing surface in which Ra is substantially zero (mirror surface), and the thickness of the jetting ink layer becomes B. When the calculated ink amount is jetted, the average thickness of the cured smooth ink layer 61 becomes B.

The ink is an active energy ray curable ink which will be described later.

The droplet size of the inkjet printing is the same as the droplet size in a normal inkjet printing. The ink amount of a single droplet is 3 to 15 pico-liters, and when the single droplet is jetted, a circler shape of the droplet in diameter of 12 to 40 μm is adhered on a medium to be jetted.

Since the inkjet printing is a non-contact printing method, the jetted ink has better followability to the uneven surface. In addition to the better followability, the above droplet is fine, and therefore, a highly precise design pattern can be drawn.

The undecorated uneven surface 17 and the uncured rough-surface ink layer 31 are contacted with each other. The meaning of the contact includes a state in which the undecorated uneven surface 17 and the uncured rough-surface ink layer 31 are directly contacted, as well as a state in which a primer is inserted between the undecorated uneven surface 17 and the uncured rough-surface ink layer 31 and these layers are laminated.

The printing may be patterns, characters, symbols, or may be a solid printing. The patterns may be diagrams, color classifications, and/or shadings. The solid printing may use a single color or may use a plurality of colors of ink, and the plurality of colors of inks are mixed in visual, so that it may visually present as a single color.

The printings of patterns, characters, symbols by using a plurality of colors are preferable. It is because normally, these printings are hardly realized in a brush printing and a coating machine, and also, it is hardly realized on the undecorated uneven surface in an offset printing, a gravure printing, etc.

Next, a coating process is performed.

Figure 1C:
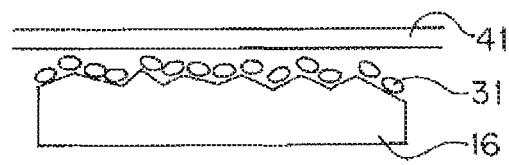
FIG. 1C is an explanatory diagram showing a method for manufacturing a decorated article.

FIG. 1C shows the undecorated base material 16 after performing the coating process. In the coating process, a temporary cover film 41 is coated on the upper surface of the uncured rough-surface ink layer 31 (that is, free surface). Both surfaces of the temporary cover film 41 are smooth surfaces. The uncured rough-surface ink layer 31 and the temporary cover film 41 are contacted with each other.

Figure 1D:
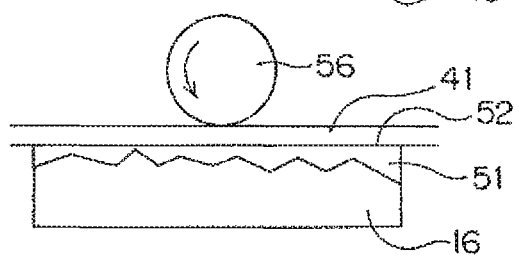
FIG. 1D is an explanatory diagram showing a method for manufacturing a decorated article.

Next, a pressing process is performed. FIG. 1D shows the undecorated base material 16 when performing the pressing process. The pressing force applies from the upper surface of the temporary cover film 41 (that is, the surface different from the surface which contacts to the uncured rough-surface ink layer) to the uncured rough-surface ink layer 31.

In the present embodiment, the pressing force applies to the uncured rough-surface ink layer 31 by using a pressing roll 56. A squeegee may be used instead of the pressing roll 56, or a compressing pressing machine may be used.

The pressing force applies to the uncured rough-surface ink layer 31 from the upper surface of the temporary cover film 41, and therefore, the pressing force is transmitted through the temporary cover film 41. In order to prevent the deformation of the undecorated base material 16, for example, while supporting the under surface of the undecorated base material 16 by a lower surface roll, etc., the pressing force may apply by using both the pressing roll 56 and the lower surface roll.

The surface of the uncured rough-surface ink layer 31 (that is, the surface which contacts with the temporary cover film) is smoothed by applying the pressing force. It is because the uncured rough-surface ink layer 31 is uncured and has mobility, and when the rigidity of the uncured rough-surface ink layer 31 and the rigidity of the undecorated base material 16 are compared, the rigidity of the uncured rough-surface ink layer 31 is smaller, so that the upper surface of the uncured rough-surface ink layer 31 is fluidly deformed.

Because of this, the smooth surface 52 is formed on the uncured smooth ink layer 51 by the pressing process.

Figure 1E:
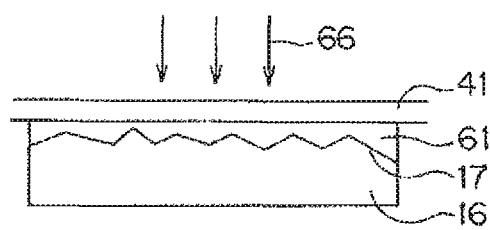
FIG. 1E is an explanatory diagram showing a method for manufacturing a decorated article.

Next, a curing process is performed. FIG. 1E is an explanatory diagram showing the curing process. In the curing process, an active energy ray 66 is applied to the uncured smooth ink layer 51 from the upper side of the temporary cover film 41, and the uncured smooth ink layer 51 changes to a cured smooth ink layer 61. The active energy ray irradiation apparatus is positioned in the upper side of the temporary cover film 41, and it may not be in contact with the temporary cover film 41, or it may be positioned in contact with the temporary cover film 41. The active energy ray 66 reaches the uncured smooth ink layer 51 through the temporary cover film 41.

Figure 1F:
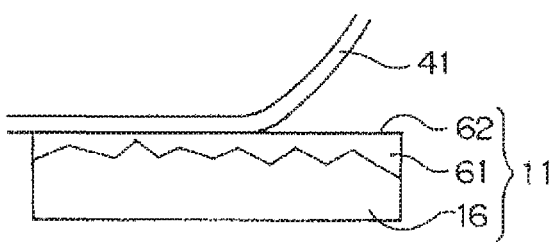
FIG. 1F is an explanatory diagram showing a method for manufacturing a decorated article.

Finally, a peeling process is performed. FIG. 1F is an explanatory diagram showing the peeling process. The peeling process is the process in which the temporary cover film 41 is removed from the undecorated base material 16. When performing the peeling process, the decorated article 11 in which the cured smooth ink layer 61 is mounted in contact with the undecorated uneven surface 17 of the undecorated base material 16, is obtained.

The phrase "the cured smooth ink layer is mounted in contact with the undecorated uneven surface 17" includes the both meanings of the state in which the undecorated uneven surface 17 and the cured smooth ink layer 61 are directly contacted, and the state in which the primer coating film is sandwiched between the undecorated uneven surface 17 and the cured smooth ink layer 61.

The upper limit of the arithmetic average roughness (Ra) of the surface 62 of the cured smooth ink layer 61 is equal to or less than 0.5 µm. Further, the lower limit of Ra is equal to or more than 0.1 µm.

Figures 2A, 2B:
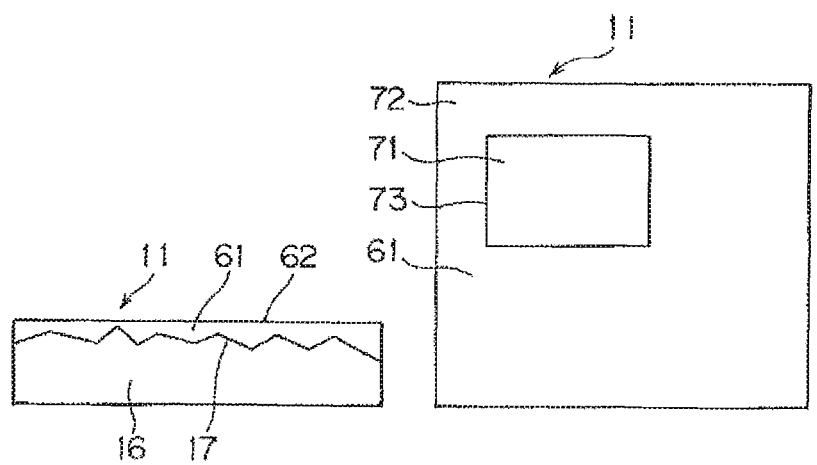
FIGS. 2A and 2B are explanatory diagrams showing a decorated article, with FIG. 2A being a cross-sectional view, and FIG. 2B being a plane view.

One embodiment of the decorated article according to the present invention will be described. FIGS. 2A and 2B are explanatory diagrams of the decorated article 11. FIG. 2A is a cross-sectional view of the decorated article 11, and FIG. 2B is a plane view.

In the decorated article 11, the cured smooth ink layer 61 is mounted on the undecorated uneven surface 17 of the undecorated base material 16.

The arithmetic average roughness (Ra) of the undecorated uneven surface 17 exceeds 0.5 µm and is equal to or less than 5.0 µm, and more preferably, Ra exceeds 0.5 µm and is equal to or less than 1.0 µm.

When the arithmetic average roughness (Ra) of the undecorated uneven surface is defined as A, normally, the average thickness of the cured smooth ink layer 61 is equal to or more than 1.1 A and equal to or less than 2.0 A. It is preferable to be equal to or more than 1.1 A and equal to or less than 1.5 A, and more preferable to be equal to or more than 1.1 A and equal to or less than 1.4 A. Within the ranges, the material of the cured smooth ink layer 61 can be saved, and also, the surface 62 can be smoothed.

For the surface 62 of the cured smooth ink layer 61, the upper limit of its arithmetic average roughness (Ra) is equal to or less than 0.5 µm. Further, the lower limit of Ra is equal to or less than 0.1 µm.

The cured smooth ink layer 61 is the layer in which the active energy ray curable ink is cured by applying the active energy ray. The preferred active energy ray curable ink is an ultraviolet ray curable ink because it is generally and commonly available as an ink for inkjet printing. When the ultraviolet ray curable ink is used, it is cured by applying ultraviolet ray.

The cured smooth ink layer 61 is drawn in different colors with a plurality of colors of the active energy ray curable inks which are different from each other. In detailed aspect in which it is drawn in different colors, the illustrations of color classified patterns, straight line or curve line drawings, characters or symbols can be exemplified. In the decorated article 11 shown in FIG. 2B, the circumference 72 is colored in blue, and the color classified pattern 71 is colored in red. A border of the color classified pattern 71 and the circumference 72 is a draw classification boundary line 73.

<Method for Manufacturing Drawn Article and the Drawn Article>

Next, a method for manufacturing a drawn article and the drawn article will be described.

FIGS. 3A through 3D are explanatory diagrams showing the method for manufacturing the drawn article 21. FIGS. 3A through 3F show a cross-sectional view of a blank base material 26 and other members.

Figure 3A:
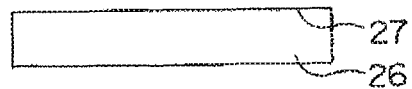
FIG. 3A is an explanatory diagram showing a method for manufacturing a drawn article.

The blank base material 26 shown in FIG. 3A includes a blank surface 27, on which a drawing is to be made. The arithmetic average roughness (Ra) of the smoothness of the blank surface 27 preferably exceeds 0.1 µm and is equal to or less than 1.0 µm, and more preferably, it exceeds 0.1 µm and is equal to or less than 0.5 µm. The smooth surface in the ranges is preferable because it is visually smooth surface and feels smoothness from the sense of touch, and it is expected to smooth the printing surface as a result in which the inkjet printing is performed to the smooth surface, but conventionally, the smoothness of the printing surface was not realized.

The thickness of the blank base material 26 is not limited, so that the drawing method can be performed in any thickness. For example, the decoration method can be preferably applied to a paper in thickness of 5 µm to 500 µm, a resin film in the same thickness range, and a resin sheet in the same thickness range.

Further, the plane size of the blank base material 26 is not specifically limited. The plane size which can be decorated in a single cycle is determined depending on the surface size which can be printed by the inkjet printer, the area where the active energy ray can be applied in a curing process, etc.

A primer may be applied on the blank surface 27 in order to enhance the adhesiveness between the active energy ray curable ink and the blank surface 27.

Figure 3B:
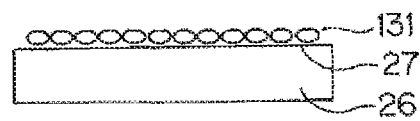
FIG. 3B is an explanatory diagram showing a method for manufacturing a drawn article.

First, a printing process is performed. The printing process is the process in which an uncured rough-surface ink layer 131 is formed on the blank surface 27 of the blank base material 26 by jetting ink fine droplets by the inkjet printing. FIG. 3B shows the blank base material 26 after the printing process.

The uncured rough-surface ink layer 131 is the aggregate of the ink fine droplets. The ink amount of the uncured rough-surface ink layer 131 is the ink amount in which the average thickness of the jetting ink layer becomes equal to or more than 1 µm and equal to or less than 10 µm by jetting ink to the printing surface in which Ra is substantially zero (mirror surface). This range is preferable because the smooth surface is obtained by flowing the uncured ink in the pressing process.

The droplet size of the inkjet printing is the same as the droplet size in a normal inkjet printing. The ink amount of a single droplet is 3 to 15 pico-liters, and when the single droplet is jetted, a circler shape of the droplet in diameter of 12 to 40 µm is adhered on a medium to be jetted.

The blank surface 27 and the uncured rough-surface ink layer 131 are contacted. The meaning of the contact includes a state in which the blank surface 27 and the uncured rough-surface ink layer 131 are directly contacted, and a state in which a primer is inserted between the blank surface 27 and the uncured rough-surface ink layer 131 and these layers are laminated.

The printing may be patterns, characters, symbols, or may be a solid printing. The patterns may be diagrams, color classifications and/or shadings. The solid printing may use a single color or may use a plurality of colors of inks, and the plurality of colors of ink is mixed in visual, so that it may be visually present as a single color.

The printings of patterns, characters, symbols by using a plurality of colors are preferable. It is because normally, these printings are hardly realized in a brush printing and a coating machine. Also, it is because the characteristics of the inkjet printings in which a printing plate is not required, specifically, at the time of small number of printings are further realized in comparison to the printing methods in which the printing plate is required such as an offset printing, a gravure printing, etc.

Next, a coating process is performed.

Figure 3C:
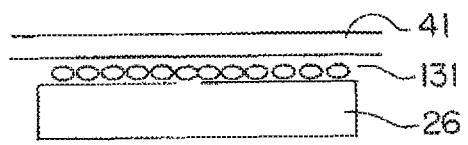
FIG. 3C is an explanatory diagram showing a method for manufacturing a drawn article.

FIG. 3C shows the blank base material 26 after performing the coating process. In the coating process, a temporary cover film 41 is coated on the upper surface of the uncured rough-surface ink layer 131 (that is, free surface). Both surfaces of the temporary cover film 41 are smooth surfaces. The uncured rough-surface ink layer 131 and temporary cover film 41 are contacted with each other.

Figure 3D:
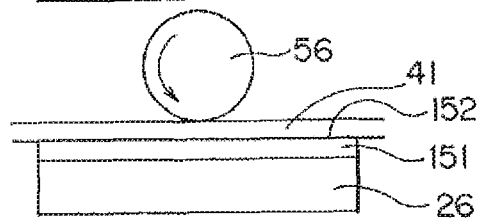
FIG. 3D is an explanatory diagram showing a method for manufacturing a drawn article.

Next, a pressing process is performed. FIG. 3D shows the blank base material 26 when performing the pressing process. The pressing force applies from the upper surface of the temporary cover film 41 (that is, the other surface different from the surface which contacts with the uncured rough-surface ink layer) to the uncured rough-surface ink layer 131.

In the present embodiment, the pressing force applies to the uncured rough-surface ink layer 131 by using a pressing roll 56. A squeegee may be used instead of the pressing roll 56, or a compressing pressing machine may be used.

The pressing force applies to the uncured rough-surface ink layer 131 from the upper surface of the temporary cover film 41, and therefore, the pressing force is transmitted through the temporary cover film 41. In order to prevent the deformation of the blank base material 26, for example, while supporting the under surface of the blank base material 26 by a lower surface roll, etc., the pressing force may apply by using both the pressing roll 56 and the lower surface roll.

The surface of the uncured rough-surface ink layer 131 (that is, the surface which contacts with the temporary cover film) is smoothed by applying the pressing force. It is because the uncured rough-surface ink layer 131 is uncured and has mobility, and when the rigidity of the uncured rough-surface ink layer 131 and the rigidity of the blank base material 26 are compared, the rigidity of the uncured rough-surface ink layer 131 is smaller, so that the upper surface of the uncured rough-surface ink layer 131 is fluidly deformed.

Because of this, the smooth surface 152 is formed on the uncured smooth ink layer 151 by the pressing process.

Figure 3E:
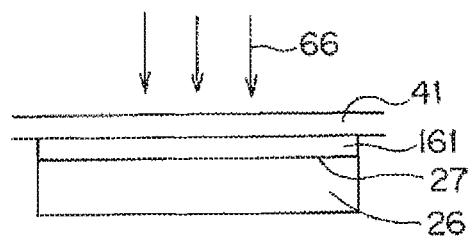
FIG. 3E is an explanatory diagram showing a method for manufacturing a drawn article.

Next, a curing process is performed. FIG. 3E is an explanatory diagram showing the curing process. In the curing process, an active energy ray 66 is applied to the uncured smooth ink layer 151 from the upper side of the temporary cover film 41, and the uncured smooth ink layer 151 changes to a cured smooth ink layer 161. The active energy ray irradiation apparatus is positioned in the upper side of the temporary cover film 41, and it may not be in contact with the temporary cover film 41, or it may be positioned in contact with the temporary cover film 41. The active energy ray 66 reaches the uncured smooth ink layer 151 through the temporary cover film 41.

Figure 3F:
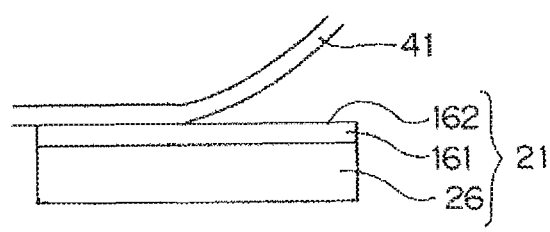
FIG. 3F is an explanatory diagram showing a method for manufacturing a drawn article.

Finally, a peeling process is performed. FIG. 3F is an explanatory diagram showing the peeling process. The peeling process is the process in which the temporary cover film 41 is removed from the blank base material 26. When performing the peeling process, the drawn article in which the cured smooth ink layer 161 is mounted in contact with the blank surface 27 of the blank base material 26, is obtained.

The phrase "the cured smooth ink layer 161 is mounted in contact with the blank surface 27" includes the both meanings of the state in which the blank surface 27 and the cured smooth ink layer 161 are directly contacted, and the state in which the primer coating film is sandwiched between the blank surface 27 and the cured smooth ink layer 161.

The upper limit of the arithmetic average roughness (Ra) of the surface 162 of the cured smooth ink layer 161 is equal to or less than 0.5 μm. Further, the lower limit of Ra is equal to or more than 0.1 μm.

Figures 4A, 4B:
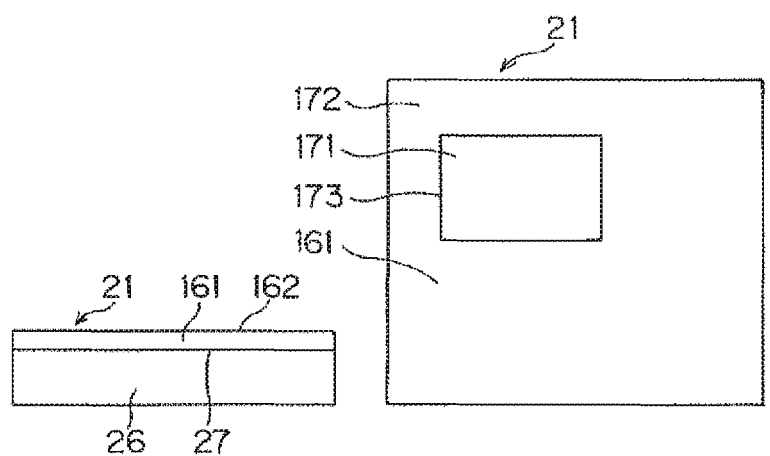
FIG. 4A and FIG. 4B are explanatory diagrams showing a drawn article, with FIG. 4A being a cross-sectional view, and FIG. 4B being a plane view.

One embodiment of the drawn article according to the present invention will be described. FIGS. 4A and 4B are explanatory diagrams of the drawn article 21. FIG. 4A is a cross-sectional view of the drawn article 21, and FIG. 4B is a plane view.

In the drawn article 21, the cured smooth ink layer 161 is mounted on the blank surface 27 of the blank base material 26.

The arithmetic average roughness (Ra) of the blank surface 27 exceeds 0.1 μm and equal to or less than 1.0 μm, and more preferably, Ra exceeds 0.1 μm and equal to or less than 0.5 μm.

Normally, the average thickness of the cured smooth ink layer 161 is equal to or more than 1 μm and equal to or less than 10 μm. Within this range, the surface 162 can be smoothed.

The cured smooth ink layer 161 is the layer in which the active energy ray curable ink is cured by applying the active energy ray. The preferred active energy ray curable ink is an ultraviolet ray curable ink because it is generally and commonly available as an ink for inkjet printing. When the ultraviolet ray curable ink is used, it is cured by applying an ultraviolet ray.

The cured smooth ink layer 161 is drawn in different colors by a plurality of colors of the active energy ray curable inks which are different from each other. In detailed aspect in which it is drawn in different colors, the illustrations of color classified patterns, straight line or curve line drawings, characters or symbols can be exemplified. In the drawn article 21 shown in FIG. 4B, the circumference 172 is colored in blue, and the color classified pattern 171 is colored in red. A border of the color classified pattern 171 and the circumference 172 is a draw classification boundary line 173.

<Compositions of Members>

Next, compositions and materials of each member will be described.

The undecorated base material is a carbon fiber reinforced plastic molding (CFRP) or a fiber reinforced plastic molding (FRP), etc. The fibers included in these moldings may be a combination of inorganic fibers such as a carbon fiber, a glass fiber, an alumina fiber, a silicon nitride fiber, etc. and organic fibers such as an aramid group fiber, nylon, etc. The long, short, textile, mat-shaped fibers or a combination of these shapes of the fibers, etc. may be regularly or irregularly arranged in the moldings.

The resins constituting CFRP or FRP are thermosetting resins such as an epoxy resin, a vinyl ester resin, an unsaturated polyester resin, a phenol resin, a benzoxazine resin, or thermoplastic resins such as an acrylic resin, polyethylene, a polypropylene resin, a polyamide resin, an ABS resin, a polybutylene terephthalate resin, a polyacetal resin, polycarbonate, etc., and modified resins in which these resins are alloyed.

A double-fluid curable urethane resin, a thermosetting urethane resin, a melamine group resin, a cellulose ester group resin, a chlorine-containing rubber group resin, a chlorine-containing vinyl group resin, an acrylic group resin, an epoxy group resin, a vinyl copolymer resin, etc. are preferably used as the primer which may be applied to the undecorated uneven surface.

The active energy ray curable ink contains small amount of colorants such as pigment, dye, etc. by using the active energy ray curable resin as a binder.

The active energy ray curable resin is the resin which is cured by applying the active energy ray. Specifically, an ultraviolet ray curable resin, an electron ray curable resin, etc. are preferable, and the ultraviolet ray curable resin is particularly preferable. As the active energy ray curable resin, an unsaturated monomer, an oligomer, a resin, and composition containing the same, etc. are preferable. As a particular example, a multifunctional active energy ray curable acrylic group compound having more than or equal to 2 functional groups such as polyfunctional acrylate, urethane acrylate, polyester acrylate, etc. is preferable. The urethane acrylate or the polyester acrylate is particularly preferable. As an active energy ray, an ultraviolet ray, electron ray, Alpha ray, Beta ray, etc. may be used. The ultraviolet ray curable composition preferably contains a photopolymerization initiator. The ultraviolet ray is applied for curing the ink which uses the ultraviolet ray curable resin.

For the temporary cover sheet, the resin sheets such as a polypropylene group resin, a polyethylene group resin, a polyamide group resin, a polyester group resin, an acrylic group resin, a polyvinyl chloride group resin, a polycarbonate group resin, a polyurethane group resin, a polystyrene group resin, an acetate group resin, etc. and cellophane, etc. are preferable.

A releasing layer may be formed on the surface which contacts with the uncured rough-surface ink layer of the temporary cover sheet. The material of the releasing layer may be a polycarbonate group resin, a cycloolefin group resin, a chlorinated polypropylene group resin, a vinyl group resin, an amide group resin, a polyester group resin, an acrylic group resin, a polyurethane group resin, an acetal group resin, a melamine group resin, a cellulose group resin, an alkyd group resin, etc., and it may contain various additive agents as needed. As a forming method of the releasing layer, in addition to the normal printing methods such as an offset printing method, a gravure printing method, a screen printing method, etc., the coating methods such as a gravure coating method, a roll coating method, a comma coating method, a lip coating method, etc., may be employed.

The base material may be a paper, a synthetic resin sheet, a synthetic resin molded article, a metal (iron, aluminum, stainless steel, titanium, titanium alloy, etc.), a wood, etc.

The arithmetic average roughness (Ra) of the undecorated uneven surface 17, the blank surface 27, and the cured smooth ink layer surface 62, 162 is measured by the surface roughness measuring device 178-368 (analysis unit 178) made of Mitsutoyo Corporation in the cutoff value 2.5 mm, the measuring section 2.5 mm×5 mm, and the range 5 µm.

Another Embodiment

In the manufacturing method of the decorated article, a temporary cover film of which an uneven surface is formed on one side of its surfaces may be used as the temporary cover film 41. For example, the unevenness may be a matte tone or a hairline tone. In the coating process, the uneven surface of the temporary cover film faces the uncured rough-surface ink layer 31, and the uncured ink layer is covered by the temporary cover film. And, when performing the pressing process, the curing process and the peeling process, a decorated article in which the unevenness is formed on the surface 62 of the cured smooth ink layer 61 can be manufactured.

The same manner is applied in the manufacturing method of the drawn article. That is, the temporary cover film 41 of which the unevenness is formed on one side of its surfaces may be used as the temporary cover film. After that, when the same processes as the manufacturing method of the decorated article are performed, a drawn article in which the unevenness is formed on the surface 162 of the cured smooth ink layer 161 can be manufactured.

In the above description, one embodiment according to the present invention is described in reference to the drawings, but the present invention should not be construed as being limited to the above-mentioned embodiment, and various modifications are possible within the range not departing from the gist of the present invention.

The invention claimed is:

1. A method for manufacturing a decorated article by decorating an undecorated uneven surface of an undecorated base material, the method comprising:
    defining an arithmetic average roughness (Ra) of the undecorated uneven surface of the undecorated base material as A, the arithmetic average roughness (Ra) of the undecorated uneven surface exceeding 0.5 µm and being equal to or less than 5.0 µm,
    calculating an ink amount to be jetted in a way in which ink is jetted to a printing surface in which an arithmetic average roughness (Ra) is zero, such that when a calculated ink amount is jetted, an average thickness of a cured smooth ink layer on the undecorated uneven surface becomes B which is defined in a range equal to or more than 1.1 A and equal to or less than 2.0 A, the calculated ink amount being a total of an ink amount which fills the unevenness of the undecorated uneven surface, and an ink amount which is a surplus amount to obtain a smooth surface of the decorated article;
    applying a primer on the undecorated uneven surface of the undecorated base material that is a molded body of a carbon fiber reinforced plastic (CFRP) or a molded body of a glass fiber reinforced plastic (FRP);
    jetting the calculated ink amount of an active energy ray curable ink on the undecorated uneven surface on which the primer has been applied, to form an uncured rough-surface ink layer, in a printing process;
    disposing a temporary cover film to cover an upper surface of the uncured rough-surface ink layer in a coating process;
    forming an uncured smooth ink layer in a pressing process by applying a pressing force to the uncured rough-surface ink layer through the temporary cover film from an upper surface of the temporary cover film, and smoothing a surface of the uncured rough-surface ink layer contacting with the temporary cover film;
    forming the cured smooth ink layer in a curing process by applying an active energy ray through the temporary cover film from the upper surface of the temporary cover film, and curing the uncured smooth ink layer, an arithmetic average roughness (Ra) of a surface of the cured smooth ink layer being equal to or less than 0.5 µm; and
    obtaining the decorated article in which the cured smooth ink layer is mounted on the undecorated uneven surface of the undecorated base material by peeling the temporary cover film in a peeling process.

2. The method for manufacturing a decorated article according to claim 1, wherein
    the active energy ray curable ink is an ultraviolet ray curable ink, and the active energy ray is an ultraviolet ray.

3. The method for manufacturing a decorated article according to claim 1, wherein
    the printing process includes printing in a plurality of colors and forming an uncured rough-surface ink layer in which the undecorated uneven surface of the undecorated base material is drawn in different colors by performing an inkjet printing and using a plurality of colors of ink that are different from each other and are active energy ray curable.

4. The method for manufacturing a decorated article according to claim 3, wherein all the active energy ray curable inks are ultraviolet ray curable inks, and the active energy ray is an ultraviolet ray.

\* \* \* \* \*